(No Model.)
T. MEIKLE.
CULTIVATOR.
No. 352,553. Patented Nov. 16, 1886.
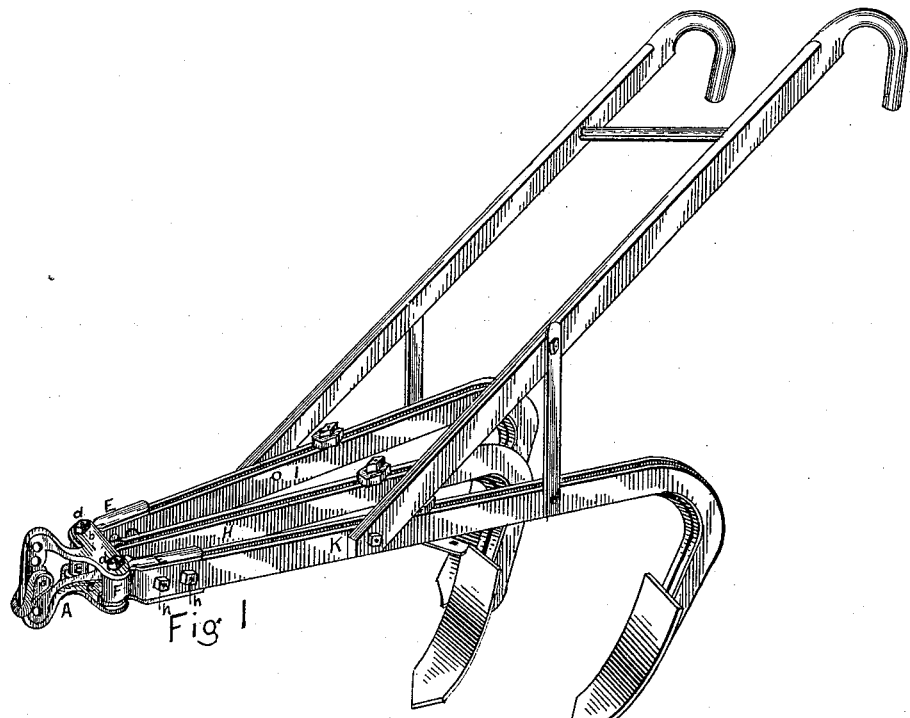
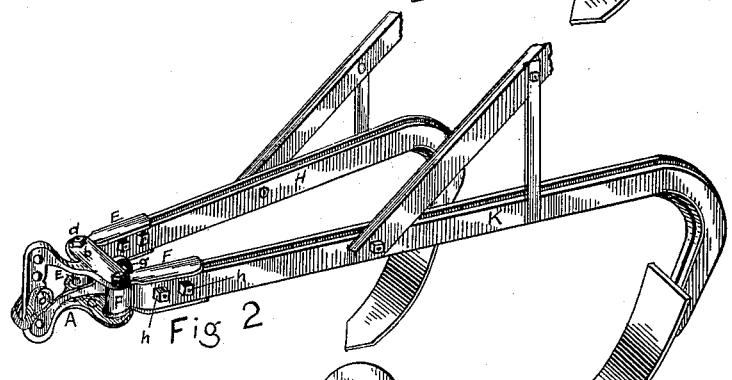
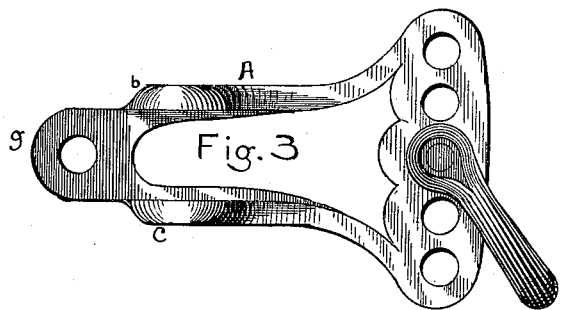
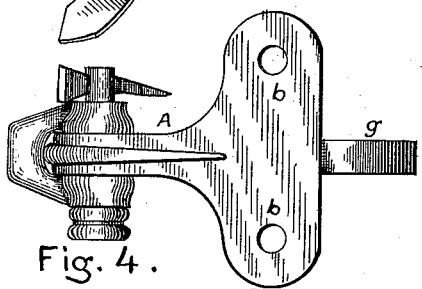
Witnesses:
Inventor
Thomas Meikle

UNITED STATES PATENT OFFICE.

THOMAS MEIKLE, OF LOUISVILLE, KENTUCKY.

CULTIVATOR.

SPECIFICATION forming part of Letters Patent No. 352,553, dated November 16, 1886.

Application filed August 4, 1886. Serial No. 209,975. (No model.)

*To all whom it may concern:*

Be it known that I, THOMAS MEIKLE, of Louisville, in the county of Jefferson and State of Kentucky, have invented new and useful Improvements in Cultivators; and I do hereby declare that the following is a full and accurate description of the same.

This invention relates to that class of cultivators known as "walking-cultivators," wherein there are sometimes two and sometimes three drag bars or beams with cultivator-hoes attached. These drag bars or beams are usually attached together at their front ends and separate toward their rear ends. When three drag-bars are employed, the center bar extends forward and has the draft attachment at its front end, and the side bars are attached to said center bar at each side of the same. When three drag-bars are employed, the side hoes are set opposite each other, and the center hoe is set farther forward than the other two; but when two bars are employed one is shorter than the other, so that the hoes are not set opposite each other.

The object of my invention is to render it easy to change the cultivator with three bars, and the center one shorter than the others, into a cultivator with two bars, one shorter than the other, by removing one of the side bars and putting the short center bar in its place. So far as I am aware no one heretofore has constructed the cultivator so as to be capable of this transformation readily.

My invention therefore consists, principally, in a clevis-plate coupling which serves the double purpose of receiving the draft and connecting the drag-bars of the cultivator.

In the accompanying drawings, Figure 1 is a perspective view of my cultivator. Fig. 2 is a perspective view of the same with two drag-bars. Fig. 3 is a side elevation of the clevis detached. Fig. 4 is a plan of the same.

A is my clevis, which, so far as the adjustable attachments are concerned, does not necessarily differ from other clevises. The plate A is provided with two transverse bars or plates, $b\ c$, projecting at each side of said plate A, constituting joint lugs to receive the joint bolts $d$, whereby the two side clips, E F, are attached to the clevis. The plate A also has a rearward extension, $g$, for the attachment of the center drag-bar, H, while the side bars, I K, are attached to said clips, whereby the drag-bars are severally attached to the clevis instead of being attached to and supported by each other.

When it is desired to change the cultivator from three hoes to two hoes, the outside drag-bar is unbolted and removed and the center bar is removed to the outside and put in place of the bar which was removed. This is easy, because the front ends of all the bars are alike and are fastened by similar bolts, $h$. By these means the same cultivator may be made double-tooth or triple-tooth, as preferred, and the short beam may be on the right-hand side or left-hand side, as preferred.

Having described my invention, I claim as new—

1. The clevis A, provided with the lateral studs or arms $b\ c$ to receive the coupling-bolts $d$, and the rear projection, $g$, whereby the cultivator drag-bars are attached to the clevis instead of to each other, substantially as set forth.

2. The clevis A, provided with the lateral studs or arms $b\ c$, and the rearward projection $g$, combined with the clips E F, hinged to said arms, and the drag-bars H I K, as set forth.

THOMAS MEIKLE.

Witnesses:
C. J. F. ALLEN,
W. E. AUSTIN.